United States Patent
Pleyer

[11] Patent Number: 6,092,875
[45] Date of Patent: Jul. 25, 2000

[54] HOLDER FOR A BELT LOCK

[75] Inventor: Matthias Pleyer, Senden, Germany

[73] Assignee: Takata (Europe) Vehicle Safety Technology GmbH, Ulm, Germany

[21] Appl. No.: 09/074,408

[22] Filed: May 8, 1998

[51] Int. Cl.[7] .................................................. B60R 22/00
[52] U.S. Cl. ........................ 297/470; 297/471; 280/801.1
[58] Field of Search ..................................... 297/468, 471, 297/470, 482; 280/801.1

[56] References Cited

U.S. PATENT DOCUMENTS

| | | | |
|---|---|---|---|
| 3,438,674 | 4/1969 | Radke et al. ............................ | 297/471 |
| 4,208,778 | 6/1980 | Ellens . | |
| 4,575,118 | 3/1986 | Matsui et al. ........................... | 297/468 |
| 4,645,231 | 2/1987 | Takada . | |
| 4,923,214 | 5/1990 | Siegrist et al. ........................ | 280/801.1 |
| 4,928,992 | 5/1990 | Qvint et al. ............................. | 297/468 |
| 5,064,220 | 11/1991 | Ogawa ................................. | 280/801.1 |

FOREIGN PATENT DOCUMENTS

| | | | |
|---|---|---|---|
| 2344308 | 3/1975 | Germany ............................... | 297/471 |
| 2502925 | 7/1975 | Germany ............................... | 297/471 |
| 296 09 436 U | 11/1996 | Germany . | |

*Primary Examiner*—Anthony D. Barfield
*Attorney, Agent, or Firm*—Foley & Lardner

[57] ABSTRACT

A holder (10) for a belt lock (12) of a safety belt comprises a plurality of leaves which are connected together, whereby a relative movement is possible between the belt lock and the seat structure.

12 Claims, 1 Drawing Sheet

FIG. 1
FIG. 2
FIG. 3
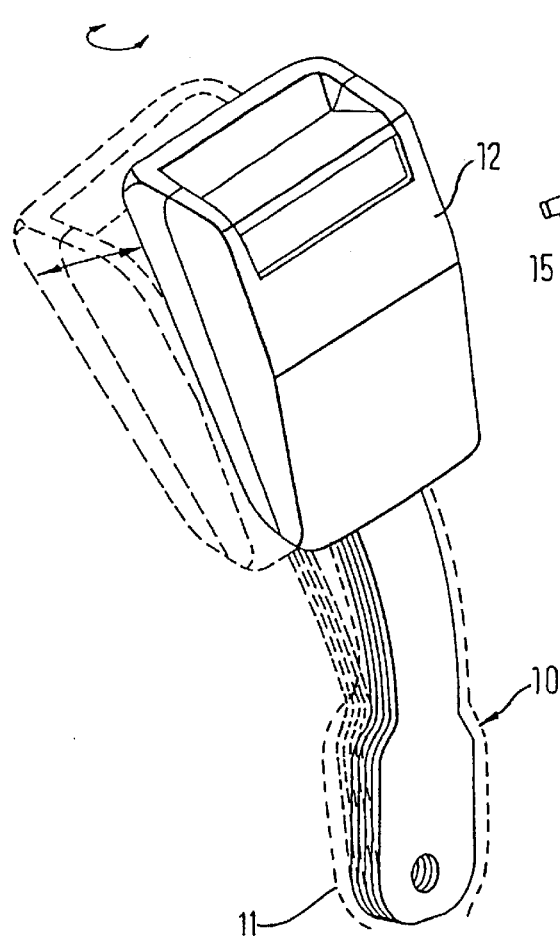
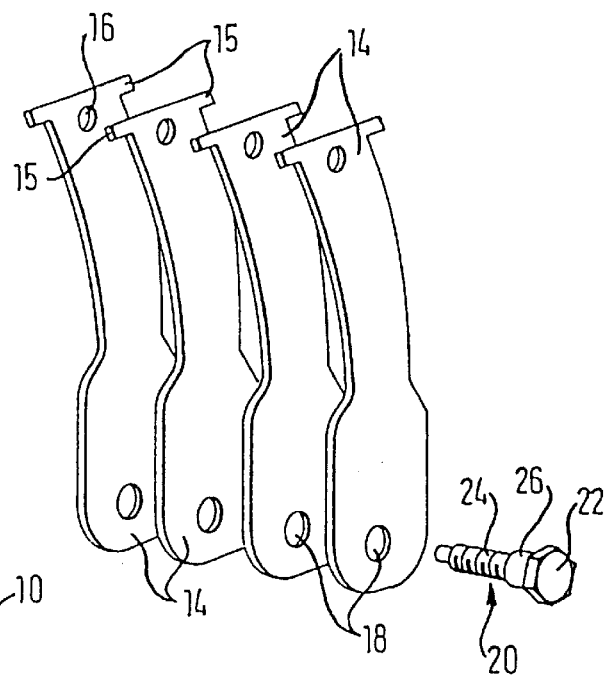
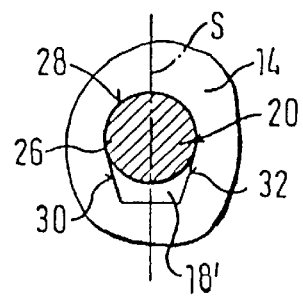

HOLDER FOR A BELT LOCK

BACKGROUND OF THE INVENTION

1. Field of the Invention

The present invention relates to a holder for a belt lock of a safety belt.

2. Description of Related Art

Safety belt lock holders are basically known and serve to connect the belt lock of a safety belt to a vehicle or to a seat structure of a vehicle. A known embodiment of such a holder comprises a rigid steel hoop which does not permit any relative movement. For this reason it is necessary to provide a separate spring system in the lock head to achieve its mobility.

A further known holder of a belt lock comprises a steel cable which is connected to the belt lock and is secured to the seat structure via an end fitting. This known solution is relatively expensive because the end fitting is complicated and expensive to manufacture, in particular with complicated attachment geometries, and can also lead to strength problems.

SUMMARY OF THE INVENTION

It is an object of the present invention to provide a holder for a belt lock of a safety belt which permits a relative movement between the belt lock and the seat structure and which can be manufactured a favorable cost.

This object is satisfied by the fact that the holder consists of a plurality of leaves which are connected together at a first position such that a restricted movement of the leaves is possible at the first position perpendicular to a direction of connection. In this way the resulting attachment of the belt lock to the seat structure has excellent strength and, simultaneously, a certain degree of flexibility to permit relative movements. The pack of leaves in accordance with the invention can, moreover, be pre-manufactured at favorable cost and can, depending on the attachment geometry, be adapted to the prevailing requirements by providing it with a specific contour. At the same time the flexibility of the leaf pack is not lost through such contouring. The solution of the invention thus combines the advantages of the rigid steel hoop with those of the flexible steel cable.

Advantageous embodiments of the invention are described in the description, the drawings and the subordinate claims.

In accordance with a first advantageous embodiment, the leaves can be connected together at one point in such a way that a restricted movement of the leaves is possible at this position perpendicular to the direction of connection. A connection of this kind assists the flexibility of the leaf pack because a relative movement is possible between the individual leaves at the connection point.

In accordance with a further embodiment of the invention the leaves are curved or cranked. In this way the belt lock can be arranged, even with unfavorable installation conditions, such that it lies at a position which is easily reached. At the same time the flexibility of the leaf pack is not lost by the curved or cranked construction.

In accordance with a further embodiment of the invention the leaves are surrounded by a sleeve, for example a shrunk hose. This results, on the one hand, in an attractive optical design and, on the other hand, also reduces the danger of injury. In addition, the leaf pack can be pre-manufactured using this embodiment, which facilitates the further assembly.

In order to ensure a relative movement of the individual leaves it is sufficient to connect the leaves together with the usual manufacturing tolerance. In addition, the leaves can, also have an attachment cut-out which is formed as an elongate hole. In this way the individual leaves can slide relative to one another in the area of the elongate hole, when the belt lock is moved relative to the seat structure.

It is particularly advantageous when the leaves are provided with an attachment cut-out which has convergent wall sections. On attaching the leaf pack to a seat structure with the aid of a bolt, the bolt contacts the convergent wall section. Under load, these wall sections can deform and take up the load. At the same time the plastic deformation of the wall sections restricts the tensile load which has to be picked up at the outermost leaf and ensures a sharing of the tensile load by all the leaves.

BRIEF DESCRIPTION OF THE DRAWINGS

In the following the present invention will be described purely by way of example and with reference to an advantageous embodiment and to the accompanying drawings in which are shown:

FIG. 1 is a perspective view of a holder in accordance with the invention with a belt lock attached thereto;

FIG. 2 is an exploded view of the holder of FIG. 1; and

FIG. 3 is a detailed illustration of an attachment cut-out.

DETAILED DESCRIPTION OF PREFERRED EMBODIMENTS

FIG. 1 shows a perspective view of the holder 10 of the invention with a belt lock 12 being attached to its front end. As can be seen in particular in FIG. 2, the holder 10 consists of four identically designed leaves 14, which are connected together to form a leaf pack or a spring pack. Each individual leaf 14 has a curved shape as seen in longitudinal section.

Each leaf 14 has an upper attachment cut-out 16 and a lower attachment cut-out 18. The individual leaves 14 are connected together via a non-illustrated riveted connection, on the one hand, and to the belt lock 12, on the other hand, with the riveted connection being passed through the upper attachment cut-outs 16. A bolt 20 can be passed through the lower attachment cut-outs 18, which are in line with one another in just the same way as the upper attachment cut-out 16, in order to secure the holder to a seat structure. As FIG. 2 shows, the bolt has a head 22, a thread 24 and a cylindrical shaft portion 26 between the head and the thread. The shaft section 26 has an axial length which corresponds to the thickness of the individual leaves 14, and a spring ring can be additionally pushed over the belt 20 for an attachment with pre-load.

Furthermore, as FIG. 2 shows, the leaves 14 are broader in their lower third, i.e. in the area of the lower attachment cut-out 18, to ensure increased strength in the region of attachment to the seat structure. In this region abutment pins (not shown) are furthermore provided on the innermost leaf, which engage into corresponding cut-outs at the seat structure and restrict a movement about the axis of the screw 20. At their upper ends, the leaves 14 are provided with laterally broadened portions 15, which ensure a better contact within the belt lock.

After the attachment of the holder of the invention to a seat structure with the aid of an attachment screw 20, the belt lock 12 attached thereto can be moved both in the direction of attachment and also somewhat rotated since the leaf pack has a certain flexibility. A relative movement of the individual leaves relative to one another is possible through the manufacturing tolerances in the area of the upper attachment and also of the lower attachment of the leaves.

FIG. 3 shows a further embodiment of an attachment cut-out 18' which ensures an improved relative movement of the individual leaves or lamella. The illustrated attachment cut-out 18' has a curved wall section 28 which is joined on both sides of the line of symmetry S by two convergent wall sections 30, 32. The cylindrical shaft section 26 of the bolt 20 is thereby located within the curved wall portion 28.

In this embodiment the cylindrical shaft portion 26 of the bolt 20 contacts the convergent wall portions 30, 32, whereby the latter, on the one hand, take up the load and, on the other hand, is also able to deform under load. In the event of an accident the plastic deformation in the area of the attachment cut-out 18' serves to restrict the tension load which has to be picked up at the outermost leaf. At the same time the tensile load is thereby distributed to all leaves.

The leaves of the holder of the invention are preferably spring steel leaves. The spring characteristics of the holder of the invention can be varied by appropriate choice of the number and thickness of the leaves. Protection against corrosion, which is in particular required because of the relative movement of the leaves, can be achieved by corrosion protection means or by a suitable choice of material for the leaves.

In accordance with a further embodiment of the invention, the leaves 14 are surrounded by a sleeve 11, for example, a shrunk hose. The sleeve 11 allows for an attractive design and reduces the risk of injury.

What is claimed is:

1. A seat belt buckle arrangement comprising:
   a buckle having an open mouth for receiving a tongue and for retaining the tongue therein, and
   a holder having a plurality of leaves which are connected together to form a spring pack, the leaves being connected together and to the buckle at a first position, wherein the leaves are connected together at a second position opposite to the first position such that a restricted movement of the leaves is possible at the second position perpendicular to a direction of connection.

2. A seat belt buckle arrangement in accordance with claim 1, wherein the leaves are curved.

3. A seat belt buckle arrangement in accordance with claim 1, further comprising a sleeve surrounding the spring pack.

4. A seat belt buckle arrangement in accordance with claim 3, wherein the sleeve is a shrunk sleeve.

5. A seat belt buckle arrangement in accordance with claim 1, wherein the leaves have a cut-out formed as an elongate hole.

6. A seat belt buckle arrangement in accordance with claim 1, wherein the leaves have convergent wall sections.

7. A seat belt buckle arrangement in accordance with claim 1, wherein the leaves are movable relative to one another at the second position.

8. A seat belt buckle arrangement in accordance with claim 6, wherein the convergent wall sections adjoin a circularly curved wall section.

9. A seat belt buckle arrangement in accordance with claim 1, further comprising a bolt for connecting the plurality of leaves together at the first position.

10. A seat belt buckle arrangement in accordance with claim 1, wherein each leaf can move relative to another leaf.

11. A seat belt buckle arrangement in accordance with claim 1, wherein each leaf is a spring steel leaf.

12. A scat belt buckle arrangement in accordance with claim 1 further comprising an elongate cut-out in each of the plurality of leaves for mounting the plurality of leaves to a seat structure, wherein each cut-out has a convergent wall section that adjoins a circularly curved wall section.

* * * * *